United States Patent
Yoshida et al.

(10) Patent No.: US 12,546,943 B2
(45) Date of Patent: Feb. 10, 2026

(54) OPTICAL DEVICE AND OPTICAL APPARATUS

(71) Applicant: FURUKAWA ELECTRIC CO., LTD., Tokyo (JP)

(72) Inventors: Masahiro Yoshida, Tokyo (JP); Yosuke Terada, Tokyo (JP)

(73) Assignee: FURUKAWA ELECTRIC CO., LTD., Tokyo (JP)

( * ) Notice: Subject to any disclaimer, the term of this patent is extended or adjusted under 35 U.S.C. 154(b) by 288 days.

(21) Appl. No.: 18/337,490

(22) Filed: Jun. 20, 2023

(65) Prior Publication Data

US 2023/0333322 A1    Oct. 19, 2023

Related U.S. Application Data

(63) Continuation of application No. PCT/JP2021/048042, filed on Dec. 23, 2021.

(30) Foreign Application Priority Data

Dec. 25, 2020 (JP) ................. 2020-216323

(51) Int. Cl.
G02B 6/293     (2006.01)
(52) U.S. Cl.
CPC ................. G02B 6/29344 (2013.01)
(58) Field of Classification Search
CPC .................................................. G02B 6/29344

(Continued)

(56) References Cited

U.S. PATENT DOCUMENTS 6,353,694 B1 * 3/2002 Paiam ................. G02F 1/0147
                                                    385/39
6,603,893 B1    8/2003 Liu et al.

(Continued)

FOREIGN PATENT DOCUMENTS

CN    105404028 A    3/2016
CN    107764775 A    3/2018

(Continued)

OTHER PUBLICATIONS

"Optical Multi-Mode Interference Devices Based on Self-Imaging: Principles and Applications" by Soldano et al, Journal of Lightwave Technology, vol. 13, No. 4, pp. 615-627 (Year: 1995).*

(Continued)

*Primary Examiner* — Robert Tavlykaev
(74) *Attorney, Agent, or Firm* — Oblon, McClelland, Maier & Neustadt, L.L.P.

(57) ABSTRACT

An optical device includes: a coupler that includes a first port, a second port, a third port, a fourth port, and a multimode interference waveguide; a first waveguide that is optically connected to the first port, the first waveguide being configured to guide light that is input to the coupler via the first port; a second waveguide that is optically connected to the second port, the second waveguide being configured to guide light that is input to the coupler via the second port; a third waveguide that is optically connected to the third port, the third waveguide being configured to guide light that is output from the coupler via the third port; and a fourth waveguide that is optically connected to the fourth port and, the fourth waveguide being configured to guide light output from the coupler via the fourth port.

7 Claims, 7 Drawing Sheets

(58) Field of Classification Search
USPC .................. 385/1–3, 14, 15, 17, 20, 28, 42
See application file for complete search history.

(56) References Cited

U.S. PATENT DOCUMENTS

| | | | |
|---|---|---|---|
| 11,474,384 B2 * | 10/2022 | Kharel | .................. G02B 6/125 |
| 2004/0190562 A1 | 9/2004 | Nakano et al. | |
| 2005/0036737 A1 | 2/2005 | Stuart | |
| 2006/0056002 A1 * | 3/2006 | Wooten | .................. G02F 1/225 |
| | | | 359/245 |
| 2008/0095485 A1 * | 4/2008 | Sugiyama | ............. G02F 1/0356 |
| | | | 385/3 |
| 2010/0067841 A1 * | 3/2010 | Sugiyama | ............. G02F 1/2255 |
| | | | 385/3 |
| 2013/0202312 A1 | 8/2013 | Shen et al. | |
| 2016/0161824 A1 * | 6/2016 | Chimot | ................. G02F 1/0147 |
| | | | 385/2 |
| 2017/0248760 A1 | 8/2017 | Hu et al. | |

FOREIGN PATENT DOCUMENTS

| | | | | |
|---|---|---|---|---|
| CN | 110609399 A | * | 12/2019 | ............. G02F 1/025 |
| JP | 2003-84327 A | | 3/2003 | |
| JP | 2004-361952 A | | 12/2004 | |
| JP | 2011-175109 A | | 9/2011 | |
| JP | 2012-098472 A | * | 5/2012 | ............. G02F 1/035 |

OTHER PUBLICATIONS

International Search Report issued Mar. 15, 2022 in PCT/JP2021/048042 filed on Dec. 23, 2021, 3 pages.

Takeda et al., "Single Mode and Dynamic All-Optical Flip-Flop Operation of Multimode Interference Bistable Laser Diodes with Distributed Bragg Reflectors" European Conference on Optical Communications, 2006, 3 pages.

Takenaka et al., "Multimode Interference Bistable Laser Diode" IEEE Photonics Technology Letters, vol. 15, No. 8, 2003, 3 pages.

Japanese Office Action issued Sep. 10, 2024 in Japanese Patent Application No. 2020-216323 (with unedited, machine-generated English translation), 13 pages.

Chinese Office Action dated Nov. 29, 2025, in Chinese Patent Application No. 202180085468.3, w/English translation, citing documents 1 & 2 therein, 16 pages.

* cited by examiner

OPTICAL DEVICE AND OPTICAL APPARATUS

REFERENCE TO RELATED APPLICATION(S)

This application is a continuation of International Application No. PCT/JP2021/048042, filed on Dec. 23, 2021 which claims the benefit of priority of the prior Japanese Patent Application No. 2020-216323, filed on Dec. 25, 2020, the entire contents of which are incorporated herein by reference.

BACKGROUND OF THE INVENTION

The present disclosure relates to an optical device and an optical apparatus.

In the related art, an optical device including a multimode interference lens has been known as an optical device in which a waveguide is formed (for example, U.S. patent application No. 2005/0036737). In U.S. patent application No. 2005/0036737, the multimode interference lens is provided at a portion where two waveguides intersect each other. From the viewpoint of transmission quality, the crossing angle of the two waveguides is set between 80° and 100°.

SUMMARY OF THE INVENTION

However, as described above, because the crossing angle of the two waveguides is between 80° and 100°, which is relatively large, in the technology disclosed in U.S. patent application No. 2005/0036737, downsizing of the optical device may become difficult.

Consequently, it is desirable to provide, for example, novel and further improved optical device and optical apparatus that can be further reduced in size.

In some embodiments, an optical device includes: a coupler that includes a first port, a second port separated from the first port in a first direction, a third port separated from the second port in a second direction intersecting the first direction, a fourth port separated from the first port in the second direction, and a multimode interference waveguide configured to guide light input from the first port to the third port and guide light input from the second port to the fourth port; a first waveguide that is optically connected to the first port, the first waveguide being configured to guide light that is input to the coupler via the first port; a second waveguide that is optically connected to the second port, the second waveguide being configured to guide light that is input to the coupler via the second port; a third waveguide that is optically connected to the third port, the third waveguide being configured to guide light that is output from the coupler via the third port; and a fourth waveguide that is optically connected to the fourth port and, the fourth waveguide being configured to guide light output from the coupler via the fourth port.

In some embodiments, an optical apparatus includes: the optical device; and an optical component optically connected to the optical device.

The above and other objects, features, advantages and technical and industrial significance of this disclosure will be better understood by reading the following detailed description of presently preferred embodiments of the disclosure, when considered in connection with the accompanying drawings.

DETAILED DESCRIPTION

Figure 1:
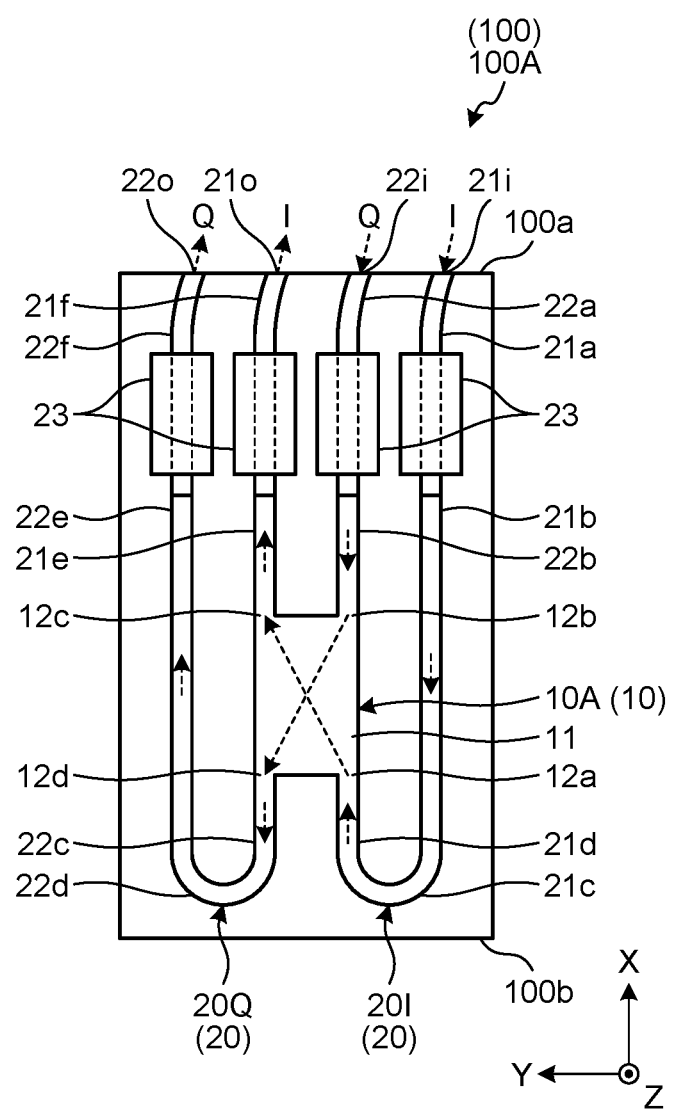
FIG. 1 is an exemplary and schematic plan view of an optical device of a first embodiment.

Hereinafter, exemplary embodiments of the disclosure will be disclosed. The configurations of the embodiments described below, and the actions and results (effects) brought about by the configurations are merely examples. The disclosure can also be implemented by configurations other than those disclosed in the following embodiments. Moreover, according to the disclosure, it is possible to obtain at least one of various effects (including derivative effects) obtained by the configurations.

The embodiments described below have similar configurations. Thus, according to the configuration of each embodiment, it is possible to obtain the same actions and effects based on the similar configuration. Moreover, in the following, the same reference numerals denote the same components, and the repeated description thereof may be omitted.

In the present specification, ordinal numbers are given for convenience to distinguish portions, directions, and the like, and are not intended to indicate priority or order.

Moreover, in each drawing, the X direction is represented by an arrow X, the Y direction is represented by an arrow Y, and the Z direction is represented by an arrow Z. The X direction, the Y direction, and the Z direction intersect with each other and are orthogonal to each other.

First Embodiment

Overall Configuration of Optical Device

FIG. 1 is a plan view of an optical device 100A (100) of a first embodiment. The optical device 100A is formed on a semiconductor substrate by a known semiconductor process. For example, the semiconductor substrate can be mainly made of a III-V semiconductor material.

For example, as illustrated in FIG. 1, in a plan view, that is, when viewed in the opposite direction to the Z direction, the optical device 100A has a rectangular appearance in which the length in the X direction is longer than the length (width) in the Y direction. Moreover, the optical device 100A has a flat parallelepiped shape as a whole, with a predetermined thickness in the Z direction.

Furthermore, the optical device 100A has two transmission paths 20 (20I, 20Q) as transmission paths for transmitting signals. The transmission path 20I transmits an I signal that is an optical signal, and the transmission path 20Q transmits a Q signal that is an optical signal. The two transmission paths 20 are provided at predetermined locations within the optical device 100A in the Z direction, substantially along a virtual plane intersecting the Z direction. The two transmission paths 20I and 20Q intersect each other at a coupler 10A (10). In other words, the coupler 10A is shared by the two transmission paths 20I and 20Q.

The I signal and the Q signal are examples of signals the phases of which differ from each other. The phase difference between the I signal and the Q signal is 90 degrees. Moreover, the I signal is an in-phase component of a complex modulation signal, and the Q signal is a quadrature component of the complex modulation signal.

The transmission path 20I is a path from an input port 21i to an output port 21o, and includes waveguides 21a, 21b, 21c, and 21d, the coupler 10A, and waveguides 21e and 21f. Each of the waveguides 21a to 21f is a section that forms the transmission path 20I. The input port 21i is an example of a first input port, and the output port 21o is an example of a first output port.

Moreover, the transmission path 20Q is a path from an input port 22i to an output port 22o, and includes waveguides 22a, 22b, 22c, and 22d, the coupler 10A, and waveguides 22e and 22f. Each of the waveguides 22a to 22f is a section that forms a waveguide path. The input port 22i is an example of a second input port, and the output port 22o is an example of a second output port. The arrangement of the transmission paths 20I and 20Q is not limited to the example in FIG. 1. For example, the transmission path 20I may be located at the location of the transmission path 20Q in FIG. 1, and the transmission path 20Q may be located at the location of the transmission path 20I in FIG. 1.

The waveguides 21a, 22a, 21f, and 22f are active waveguides, and have an embedded waveguide structure with an active layer, which is not illustrated. For example, the active layer has a multiple quantum well (MQW) structure made of a GaInAsP-based semiconductor material or an AlGaInAs-based semiconductor material.

An electrode 23 is provided corresponding to each of the waveguides 21a, 22a, 21f, and 22f. A predetermined potential difference with respect to another electrode (not illustrated) is applied to the electrode 23, and current is injected into the active region (not illustrated) of the active layer. Consequently, optical amplification occurs, and the I signal or the Q signal transmitted through the waveguides 21a, 22a, 21f, and 22f is amplified. That is, in the present embodiment, the electrode 23 and the active layer form an optical amplification portion. That is, the optical device 100A is an example of a semiconductor optical amplifier, and may also be referred to as an array-type semiconductor optical amplifier device.

Moreover, at the vicinity of an end surface 100a in the X direction, each of the waveguides 21a, 22a, 21f, and 22f is curved in the opposite direction to the Y direction as the waveguide extends toward the X direction. Consequently, the light reflected at the input ports 21i and 22i and the output ports 21o and 22o, that is, at the end surface 100a of the optical device 100A is prevented from returning to the transmission path. Moreover, an anti-reflective (AR) coating is applied to the end surface 100a to prevent reflection. Except for the curved portion at the vicinity of the end surface 100a, the waveguides 21a, 22a, 21f, and 22f extend substantially linearly along the X direction and are substantially parallel to one another. The waveguides 21a, 22a, 21f, and 22f are aligned in the Y direction at a predetermined interval, for example, at a regular interval in the Y direction.

On the other hand, the waveguides 21b, 21c, 21d, 21e, 22b, 22c, 22d, and 22e are passive waveguides, and have a high mesa waveguide structure, that is, a semiconductor mesa structure with a cladding layer and an optical waveguide path, which are not illustrated. For example, the cladding layer of the waveguide is made of n-type InP or i-type InP, and for example, the core layer is made of an i-type GaInAsP-based semiconductor material with a band-gap wavelength of 1300 [nm]. The high mesa waveguide structure can also be referred to as a deep ridge waveguide structure.

Each of the waveguides 21b, 22b, 21e, and 22e extends substantially along the X direction. Moreover, each of the waveguides 21b, 22b, 21e, and 22e is aligned in the Y direction at a predetermined interval, for example, at a regular interval in the Y direction.

Each of the waveguides 21d and 22c extends substantially along the X direction. Moreover, each of the waveguides 21d and 22c is aligned in the Y direction at a predetermined interval, for example, at a regular interval in the Y direction.

The waveguides 21d and 22b are aligned in the X direction at an interval in the X direction. Moreover, the waveguides 22c and 21e are aligned in the X direction at an interval in the X direction.

The waveguide 21c connects between the end portions of the straight waveguides 21b and 21d, the end portions being in the opposite direction to the X direction, and is curved in an arc shape or a U-shape. The waveguides 21b, 21c, and 21d form a waveguide curved in a substantially U-shape.

The waveguide 22d connects between the end portions of the straight waveguides 22c and 22e, the end portions being in the opposite direction to the X direction, and is curved in an arc shape or a U-shape. The waveguides 22c, 22d, and 22e form a waveguide curved in a substantially U-shape.

For example, each of the active waveguides 21a, 22a, 21f, and 22f and passive waveguides 21b, 22b, 21e, and 22e is optically connected by a butt joint connection and the like. A conversion region may be provided between the active waveguides 21a, 22a, 21f, and 22f and the passive waveguides 21b, 22b, 21e, and 22e to optically connect the waveguides with different structures at a low loss.

Coupler

Figure 2:
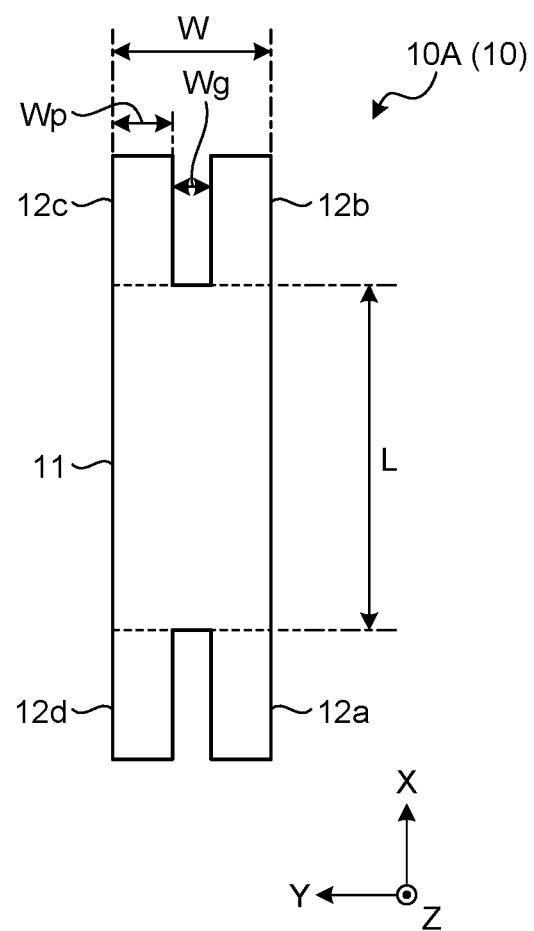
FIG. 2 is an exemplary and schematic plan view of a multimode interference waveguide included in the optical device of the first embodiment.

FIG. 2 is a plan view of the coupler 10A. As illustrated in FIG. 2, the coupler 10A includes a multimode interference waveguide 11 and four ports 12a to 12d.

In a plan view, the multimode interference waveguide 11 has a square shape, and in the present embodiment, the multimode interference waveguide 11 has a rectangular appearance in which length L in the X direction is longer than width W in the Y direction. Moreover, the multimode interference waveguide 11 has a flat parallelepiped shape as a whole, with a substantially constant thickness in the Z direction.

In a plan view, the ports 12a to 12d are optically connected to the respective four corners of the multimode interference waveguide 11. The port 12a is connected to a corner located at the end portion of the multimode interference waveguide 11 in the opposite direction to the X direction and in the opposite direction to the Y direction. The port 12b is connected to a corner located at the end portion of the multimode interference waveguide 11 in the X direction and in the opposite direction to the Y direction. The port 12c is connected to a corner located at the end portion of the multimode interference waveguide 11 in the X direction and in the Y direction. Moreover, the port 12d is connected to a corner located at the end portion of the multimode interference waveguide 11 in the opposite direction to the X direction and in the Y direction. The port 12b is separated from the port 12a in the X direction, the port 12c is separated from the port 12b in the Y direction, and the port 12d is separated from the port 12a in the Y direction. The ports 12a and 12b are aligned in the X direction, and the ports 12c and 12d are aligned in the X direction. Moreover, the ports 12b and 12c are aligned in the Y direction, and the ports 12a and 12d are aligned in the Y direction. Furthermore, the interval between the ports 12a and 12b in the X direction and the interval between the ports 12c and 12d in the X direction are substantially equal, and the interval between the ports 12b and 12c in the Y direction and the interval between the ports 12a and 12d in the Y direction are substantially equal. These ports 12a to 12d have substantially the same shape, and all the ports extend in the X direction with width Wp in the Y direction. Still furthermore, a gap Wg between the ports 12b and 12c adjacent to each other in the Y direction and a gap between the ports 12a and 12d adjacent to each other in the Y direction are substantially equal. The port 12a is an example of a first port, the port 12b is an example of a second port, the port 12c is an example of a third port, and the port 12d is an example of a fourth port.

In the multimode interference waveguide 11 in the form illustrated in FIG. 2, when the following equation (2) is satisfied, it has been found that it is possible to guide the I signal from the port 12a to the port 12c, and guide the Q signal from the port 12b to the port 12d.

$$L=4\cdot n\cdot W^2\cdot(2m-1)/\lambda \qquad (2)$$

In this example, n is an effective refractive index of the multimode interference waveguide 11, and m is a natural number of 1 or larger.

By setting or adjusting the specifications of the parts, it is possible to change the ratio of guiding the I signal from the port 12a to the port 12c, and the ratio of guiding the Q signal from the port 12b to the port 12d in the multimode interference waveguide 11 to a desired value of 50 [%] or more. In the present embodiment, the ratio is desirably close to 100 [%], and for example, the ratio is 80 [%] or more, and preferably 95 [%] or more.

For example, in the specification where W=2.9 [µm], Wp=1.2 [µm], Wg=0.5 [µm], and L=70 [µm], it is confirmed that the equation (2) is satisfied when λ=1.55 [µm] and n=3.2.

In this example, as illustrated in FIG. 1, the waveguides 21a to 21d provided at the preceding stage of the coupler 10A in the transmission path 20I for the I signal are optically connected to the port 12a of the coupler 10A. That is, the waveguides 21a to 21d guide the I signal input to the input port 21i, that is to say, the I signal input to the coupler 10A via the port 12a. In the present embodiment, the waveguide 21d immediately before the port 12a is adjacent to the port 12a in the opposite direction to the X direction, extends in the X direction, and guides the I signal in the X direction. The waveguides 21a to 21d are each an example of a first waveguide. Moreover, the waveguide 21c or the waveguides 21b, 21c, and 21d are each an example of a first curved part.

The waveguides 22a and 22b provided at the preceding stage of the coupler 10A in the transmission path 20Q for the Q signal are optically connected to the port 12b of the coupler 10A. That is, the waveguides 22a and 22b guide the Q signal input to the input port 22i, that is to say, the Q signal input to the coupler 10A via the port 12b. In the present embodiment, the waveguide 22b immediately before the port 12b is adjacent to the port 12b in the X direction, extends in the X direction, and guides the Q signal in the opposite direction to the X direction. The waveguides 22a and 22b are each an example of a second waveguide.

The waveguides 21e and 21f provided at the subsequent stage of the coupler 10A in the transmission path 20I for the I signal are optically connected to the port 12c of the coupler 10A. The waveguides 21e and 21f guide the I signal between the port 12c and the output port 21o. That is, the waveguides 21e and 21f guide the I signal output from the coupler 10A via the port 12c, that is to say, the I signal output from the output port 21o. In the present embodiment, the waveguide 21e immediately after the port 12c is adjacent to the port 12c in the X direction, extends in the X direction, and guides the I signal in the X direction. The waveguides 21e and 21f are each an example of a third waveguide.

The waveguides 22c to 22f provided at the subsequent stage of the coupler 10A in the transmission path 20Q for the Q signal are optically connected to the port 12d of the coupler 10A. That is, the waveguides 22c to 22f guide the Q signal output from the coupler 10A via the port 12d, that is to say, the Q signal output from the output port 22o. In the present embodiment, the waveguide 22c immediately after the port 12d is adjacent to the port 12d in the opposite direction to the X direction, extends in the X direction, and guides the Q signal in the opposite direction to the X direction. The waveguides 22c to 22f are each an example of a fourth waveguide. Moreover, the waveguide 22d or the waveguides 22c, 22d, and 22e are each an example of a second curved part.

As described above, in the present embodiment, the coupler 10A includes the multimode interference waveguide 11. In this example, if the coupler 10A includes a multimode interference lens as in the conventional technology instead of the multimode interference waveguide 11, it would be necessary to set the angle between the virtual line connecting the ports 12a and 12c and the virtual line connecting the ports 12b and 12d to between 80° and 100°. Accordingly, the size of the coupler 10A will be increased in the Y direction. In this regard, with the present embodiment, the coupler 10A includes the multimode interference waveguide 11, and it is possible to reduce the interval between the ports 12a and 12d and the interval between the ports 12b and 12c, that is, the width W of the multimode interference waveguide 11 (coupler 10A) in the Y direction, than that of the multimode interference lens. Thus, according to the present embodiment, it is possible to further reduce the size of the coupler 10A and, eventually, the optical device 100A.

Moreover, if the coupler 10A includes a directional coupler instead of the multimode interference waveguide 11, the usable wavelength band of the directional coupler may be limited, because the wavelength dependence of the directional coupler is larger than that of the multimode interference waveguide 11. Furthermore, because a gap between the input and output waveguides of the directional coupler needs to be reduced than that of the multimode interference waveguide 11, it may be difficult to manufacture the directional coupler or may limit the manufacturing method. Thus, according to the present embodiment, it is possible to obtain the coupler 10A and, eventually, the optical device 100A with a smaller wavelength dependence and that can be manufactured more easily.

Still furthermore, in the optical device 100A of the present embodiment, the transmission path 20I and the transmission path 20Q intersect with each other in the coupler 10A including the multimode interference waveguide 11. Hence, it is possible to collectively arrange the input ports 21i and 22i of a plurality of different transmission paths 20I and 20Q adjacent to each other, and collectively arrange the output ports 21o and 22o of the different transmission paths 20I and 20Q adjacent to each other. Thus, it is possible to arrange a transmission path (hereinafter, referred to as an external input transmission path) that optically connects the input ports 21i and 22i with an optical component different from the optical device 100A, and a transmission path (hereinafter, referred to as an external output transmission path) that connects the output ports 21o and 22o with an optical component different from the optical device 100A, outside the optical device 100A, without intersecting each other three-dimensionally.

In this example, it is assumed that there is no coupler 10A, and in a plan view, the U-shaped transmission path 20I as well as the U-shaped transmission path 20Q are aligned in the Y direction without intersecting each other in the optical device 100A. In this case, the input port 21*i* and the output port 21*o* of the transmission path 20I are collectively arranged adjacent to each other, and the input port 22*i* and the output port 22*o* of the transmission path 20Q are collectively arranged adjacent to each other, next to the input port 21*i* and the output port 21*o*. In such a layout, there may be a case where the external input transmission path that is coupled to one of the input ports 21*i* and 22*i*, and the external output transmission path that is coupled to one of the output ports 21*o* and 22*o* outside the optical device 100A, need to intersect each other three-dimensionally. In this case, the configuration of an optical apparatus including the optical device 100A and the external input transmission path and output transmission path may become more complicated.

In this regard, with the present embodiment, as described above, it is possible to collectively arrange the input ports 21*i* and 22*i* of different transmission paths 20 adjacent to each other, and collectively arrange the output ports 21*o* and 22*o* of different transmission paths 20 adjacent to each other. Thus, according to the present embodiment, for example, in the optical device 100A and, eventually, the optical apparatus including the optical device 100A, it is possible to optically connect the input ports 21*i* and 22*i* with another optical component more easily, and optically connect the output ports 21*o* and 22*o* with another optical component more easily.

Moreover, in the present embodiment, by providing the coupler 10A including the multimode interference waveguide 11, it is possible to set the optical path lengths of the different transmission paths 20I and 20Q in which the input ports 21*i* and 22*i* are collectively arranged and the output ports 21*o* and 22*o* are collectively arranged, to be substantially equal. Thus, according to the present embodiment, for example, depending on the optical path difference between the transmission paths 20I and 20Q, it is possible to suppress the loss difference, that is, the difference in the amplitude and strength, between the I signal and the Q signal from increasing, or suppress the phase difference between the I signal and Q signal from deviating from a set value.

Furthermore, in the present embodiment, the coupler 10A including the multimode interference waveguide 11 is provided at a portion having a high mesa (semiconductor mesa) structure, and is provided away from the amplification portion including the electrode 23 and the active layer. If the multimode interference waveguide 11 is provided for the active waveguides 21*a*, 22*a*, 21*f*, and 22*f* with an embedded structure including the amplification portion, the optical confinement properties of the active waveguides become lower than those of the passive waveguides having a high mesa structure. Therefore, to prevent inter-signal interference, the interval between the waveguides connected to the multimode interference waveguide 11 needs to be increased more in the Y direction, and as a result, the width W of the coupler 10A is increased more in the Y direction, thereby increasing the length L of the coupler 10A in the X direction. Eventually, the size of the optical device 100A will be increased in the X direction and the Y direction. In this regard, as in the present embodiment, by providing the coupler 10A including the multimode interference waveguide 11 in a high mesa structure, and by providing the coupler 10A away from the amplification portion including the electrode 23 and the active layer, for example, the various effects described above obtained by providing the coupler 10A including the multimode interference waveguide 11 can be obtained, while suppressing the size of the coupler 10A and, eventually, the optical device 100A from being increased.

Moreover, in the present embodiment, the input port 21*i*, the input port 22*i*, the output port 21*o*, and the output port 22*o* are provided on the end surface 100*a* of the optical device 100A in the X direction (first direction). With such a configuration, for example, there is no need to provide a plurality of the end surfaces 100*a* with high cleavage accuracy. Accordingly, it is possible to advantageously manufacture the optical device 100A at a lower cost.

Second Embodiment

Figure 3:
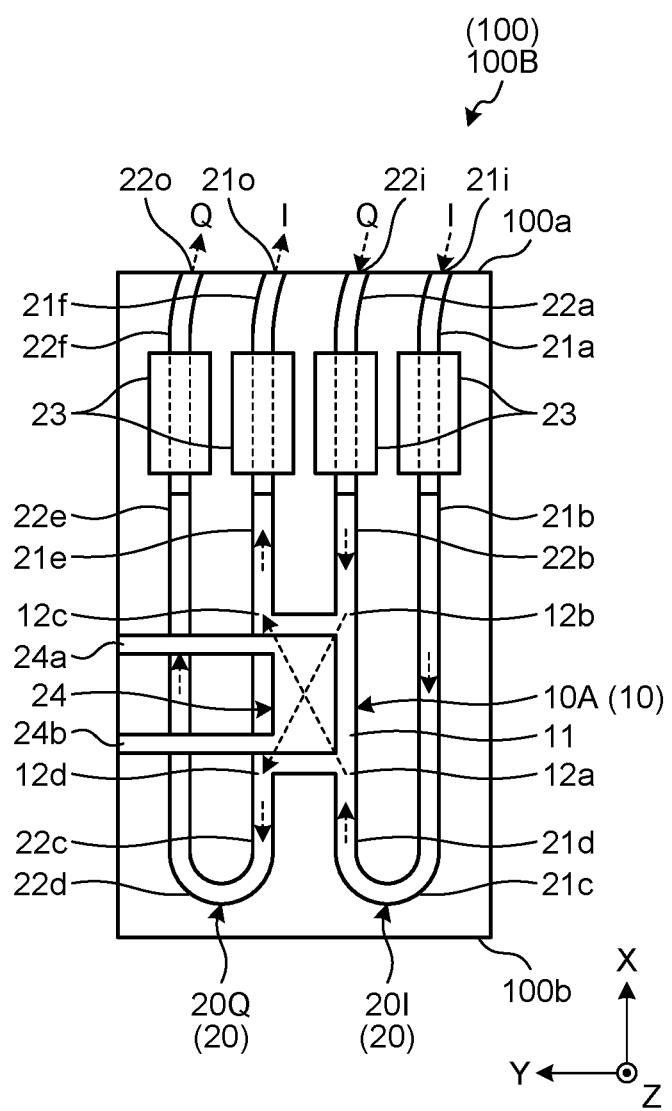
FIG. 3 is an exemplary and schematic plan view of an optical device of a second embodiment.

FIG. 3 is a plan view of an optical device 100B (100) of a second embodiment. The optical device 100B of the present embodiment differs from the optical device 100A of the first embodiment described above in including a temperature control mechanism 24 that controls the temperature of the multimode interference waveguide 11 (coupler 10A). Other than this point, the optical device 100B has the same configuration as that of the optical device 100A.

For example, the temperature control mechanism 24 is a heater arranged so as to overlap with the multimode interference waveguide 11 in the Z direction, and for example, is an electric heater that generates heat by electrical resistance to the power supplied via wires 24*a* and 24*b*. In this case, for example, the heater of the temperature control mechanism 24 is made of nickel-chromium alloy and the like. For example, the wires 24*a* and 24*b* are made of titanium, platinum, gold, alloy containing the above, or the like. Moreover, a protective film is interposed between the multimode interference waveguide 11, and the heater and the wires 24*a* and 24*b* of the temperature control mechanism 24. For example, the protective film is made of a material having a lower refractive index than that of the core and cladding of the multimode interference waveguide 11, such as silicon nitride.

According to the present embodiment, by changing the temperature of the multimode interference waveguide 11 by the temperature control mechanism 24, it is possible to change the effective refractive index n of the multimode interference waveguide 11, and consequently, change the waveguide properties and branching properties of the multimode interference waveguide 11. In the case of the multimode interference waveguide 11, there are possibilities that the desired waveguide properties or branching properties may not be obtained, due to an error in the width W and length L of the multimode interference waveguide 11 caused by manufacturing variance, or due to a change in the effective refractive index n of the multimode interference waveguide 11 in accordance with a temperature change. Even in such a case, according to the present embodiment, the temperature control mechanism 24 can correct the waveguide properties and branching properties to approximate the desired properties. Thus, according to the present embodiment, compared to the configuration without the temperature control mechanism 24, it is possible to easily obtain the desired waveguide properties and branching properties of the coupler 10A including the multimode interference waveguide 11 and, eventually, improve the light (signal) transmission quality. The temperature control mechanism 24 is not limited to an electric heater, and for example, may be a thermoelectric cooler including a thermoelectric element (Peltier element) and the like. In this case, the thermoelectric cooler may control the temperature of the optical device 100B as a whole, or may control the temperature of the multimode interference waveguide 11 locally.

Third Embodiment

Figure 4:
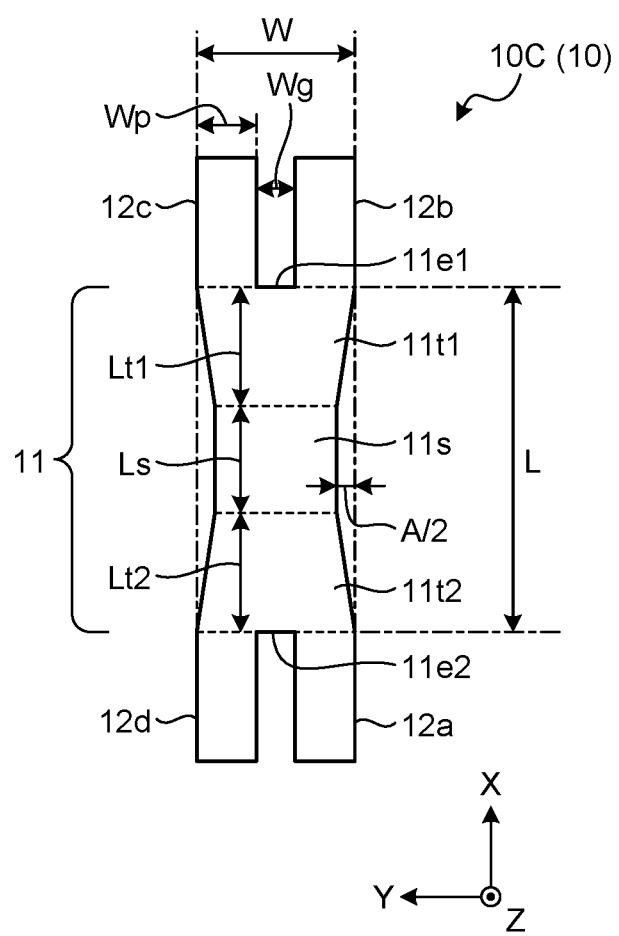
FIG. 4 is an exemplary and schematic plan view of a multimode interference waveguide of a third embodiment.

FIG. 4 is a plan view of a coupler 10C (10) of a third embodiment. The coupler 10C of the present embodiment differs from the coupler 10A of the first embodiment described above in including the multimode interference waveguide 11 having a different shape in a plan view.

As illustrated in FIG. 4, in the present embodiment, the multimode interference waveguide 11 includes tapered parts 11t1 and 11t2, and an equal width part 11s.

The tapered part 11t1 is located on the side of the ports 12b and 12c, and has a substantially isosceles trapezoid shape in a plan view. That is, the width of the tapered part 11t1 in the Y direction is gradually reduced as the tapered part 11t1 extends toward the opposite direction to the X direction, that is, as it extends close to the ports 12a and 12d.

The equal width part 11s is located on the opposite side of the tapered part 11t1 in the X direction, that is, adjacent to the tapered part 11t1 on the side of the ports 12a and 12d. Moreover, the equal width part 11s has a square shape in a plan view. That is, the width of the equal width part 11s is constant in the Y direction.

The tapered part 11t2 is located on the side of the ports 12a and 12d, and has a substantially isosceles trapezoid shape in a plan view. That is, the width of the tapered part 11t2 in the Y direction is gradually reduced as the tapered part 11t2 extends toward the X direction, that is, as it extends close to the ports 12b and 12c.

The width of the equal width part 11s and the width (minimum width) of the narrowest portion of the tapered parts 11t1 and 11t2 are substantially equal. Moreover, the lengths Lt1 and Lt2 of the tapered parts 11t1 and 11t2 in the X direction are substantially equal. Ls is the length of the equal width part 11s in the X direction.

The tapered parts 11t1 and 11t2 and the equal width part 11s are narrow width parts the average width of which is narrower than the width of end portions 11e1 and 11e2 in the X direction. Moreover, A is the difference between the width W and the minimum width of the multimode interference waveguide 11. In this case, the location of the end portion of the equal width part 11s in the X direction and in the opposite direction to the X direction, that is, the location of the end portion of the equal width part 11s in the width direction, is located inward from the end portion of the maximum width portion in the width direction by A/2. In this case, the average width of the tapered parts 11t1 and 11t2 in the Y direction is (W-A/2).

For example, the width (W-A) of the equal width part 11s is 25 [%] or more and less than 100 [%] of W. Moreover, for example, the length Ls of the equal width part 11s is 10 [%] or more and less than 100 [%] of the length L of the multimode interference waveguide 11.

With such a shape, the coupler 10C including the multimode interference waveguide 11 has high freedom of optical property design, and reduced excess loss.

As a result of diligent research by the inventors, by suitably adjusting the shape of the multimode interference waveguide 11 using a beam propagation method (BPM) analysis and the like, in the shape illustrated in FIG. 4, when the following equation (3) of $$L < 4 \cdot n \cdot W^2 \cdot (2m-1)/\lambda \quad (3)$$

is satisfied, it has been found that it is possible to guide the I signal from the port 12a to the port 12c at a ratio of at least 50 [%] or more, and guide the Q signal from the port 12b to the port 12d at a ratio of at least 50 [%] or more.

As is evident by comparing with the equation (2) described in the first embodiment, this implies that it is possible to further reduce the length of the multimode interference waveguide 11 in the X direction.

That is, according to the present embodiment, with the multimode interference waveguide 11 having a configuration that satisfies the equation (3), it is possible to further reduce the size of the coupler 10C including the multimode interference waveguide 11 and, eventually, the optical device 100 including the coupler 10C.

In the present embodiment also, by setting or adjusting the specifications of the parts, it is possible to change the ratio of guiding the I signal from the port 12a to the port 12c, and the ratio of guiding the Q signal from the port 12b to the port 12d of the multimode interference waveguide 11 to a desired value of 50 [%] or more. Moreover, in the present embodiment also, it is desirable that the ratio be close to 100 [%], and for example, the ratio is 80 [%] or more, and preferably 95 [%] or more.

Furthermore, from the first embodiment and third embodiment described above, with a configuration that satisfies the following equation (1) of $$L \leq 4 \cdot n \cdot W^2 \cdot (2m-1)/\lambda \quad (1)$$

that is obtained by combining the equation (2) and equation (3), it is apparent that it is possible to guide the I signal from the port 12a to the port 12c at a ratio of at least 50 [%] or more, and guide the Q signal from the port 12b to the port 12d at a ratio of at least 50 [%] or more.

Fourth Embodiment

Figure 5:
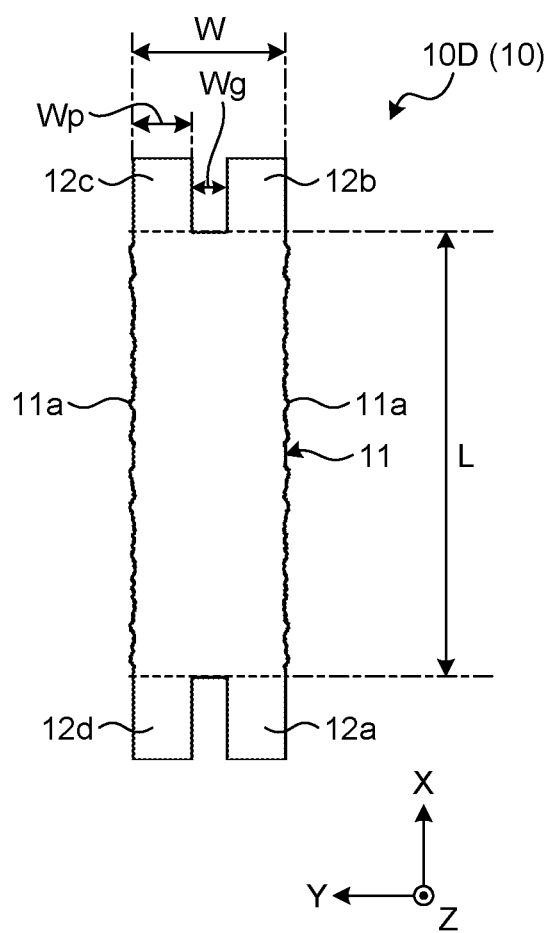
FIG. 5 is an exemplary and schematic plan view of a multimode interference waveguide of a fourth embodiment.

FIG. 5 is a plan view of a coupler 10D (10) of a fourth embodiment. The coupler 10D of the present embodiment differs from the coupler 10A of the first embodiment described above and the coupler 10C of the third embodiment described above, in including the multimode interference waveguide 11 having a different shape in a plan view.

As illustrated in FIG. 5, in the present embodiment, side edges 11a on both sides of the multimode interference waveguide 11 in the Y direction have an irregular shape including at least one of a recessed part and a protruding part. Similar to the third embodiment, by suitably adjusting the irregular shape of the side edges 11a using a BPM analysis, that is, by the design using a topology optimization method, it is possible to change the ratio of guiding the I signal from the port 12a to the port 12c, and the ratio of guiding the Q signal from the port 12b to the port 12d of the multimode interference waveguide 11 to a desired value of 50 [%] or more. In the present embodiment also, it is desirable that the ratio be close to 100 [%], and for example, the ratio is 80 [%] or more, and preferably 95 [%] or more. In FIG. 5, the Y direction is illustrated in an enlarged manner than the X direction. FIG. 5 is a configuration example in which L=90 [μm], W=3.1 [μm], Wp=1.2 [μm], and Wg=0.7 [μm].

According to the present embodiment, with the multimode interference waveguide 11 having an irregular shape including at least one of a recessed part and a protruding part on the side edges 11a, it is possible to further reduce the size of the coupler 10C including the multimode interference waveguide 11 and, eventually, the optical device 100 including the coupler 10C. Moreover, it is possible to advantageously suppress the excess loss of the coupler 10D that is designed using a topology optimization method.

Fifth Embodiment

Figure 6:
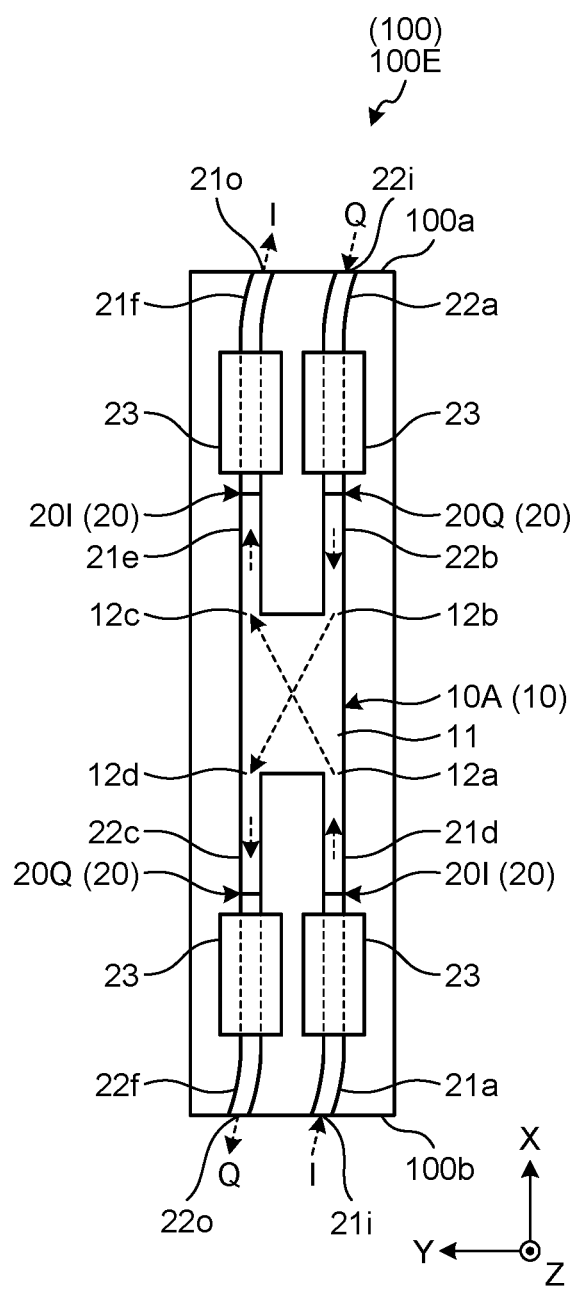
FIG. 6 is an exemplary and schematic plan view of an optical device of a fifth embodiment.

FIG. 6 is a plan view of an optical device 100E (100) of a fifth embodiment. The optical device 100E of the present embodiment differs from the optical device 100A of the first embodiment described above in that the transmission path 20I for the I signal and the transmission path 20Q for the Q signal both do not include a curved part.

As illustrated in FIG. 6, in the present embodiment, the input port 21i of the transmission path 20I is provided on an end surface 100b of the optical device 100E on the side opposite to the X direction. Then, the active waveguide 21a between the input port 21i and the passive waveguide 21d is located adjacent to the waveguide 21d in the opposite direction to the X direction.

Moreover, the output port 22o of the transmission path 20Q is also provided on the end surface 100b. Then, the active waveguide 22f between the output port 22o and the passive waveguide 22c is located adjacent to the waveguide 22c in the opposite direction to the X direction.

At the vicinity of the end surface 100b, each of the waveguides 21a and 22f is curved in the Y direction as the waveguide extends toward the opposite direction to the X direction. Consequently, the light reflected at the input ports 21i and 22i, that is, at the end surface 100b of the optical device 100E is prevented from returning to the transmission path. Moreover, an anti-reflective (AR) coating is applied to the end surface 100b to prevent reflection. Except for the curved portion at the vicinity of the end surface 100b, the waveguides 21a and 22f extend substantially linearly along the X direction and are substantially parallel to each other. The waveguides 21a and 22f are aligned in the Y direction at a predetermined interval, for example, at a regular interval in the Y direction. Furthermore, the straight portion of the waveguide 21a is aligned with the waveguide 21d in the X direction, and the straight portion of the waveguide 22f is aligned with the waveguide 22c in the X direction.

Still furthermore, the electrode 23 is provided corresponding to each of the waveguides 21a and 22f. In the present embodiment also, similar to the first embodiment described above, the electrode 23 and the active layer, which is not illustrated, form an optical amplification portion.

The optical device 100E of the present embodiment also includes the coupler 10A including the multimode interference waveguide 11. Thus, with the present embodiment also, it is possible to obtain the same effects as those of the first embodiment described above in which the coupler 10A including the multimode interference waveguide 11 is provided.

Moreover, according to the present embodiment, it is possible to further reduce the width of the optical device 100E in the Y direction, to the extent not including the U-shaped waveguide.

Sixth Embodiment

Figure 7:
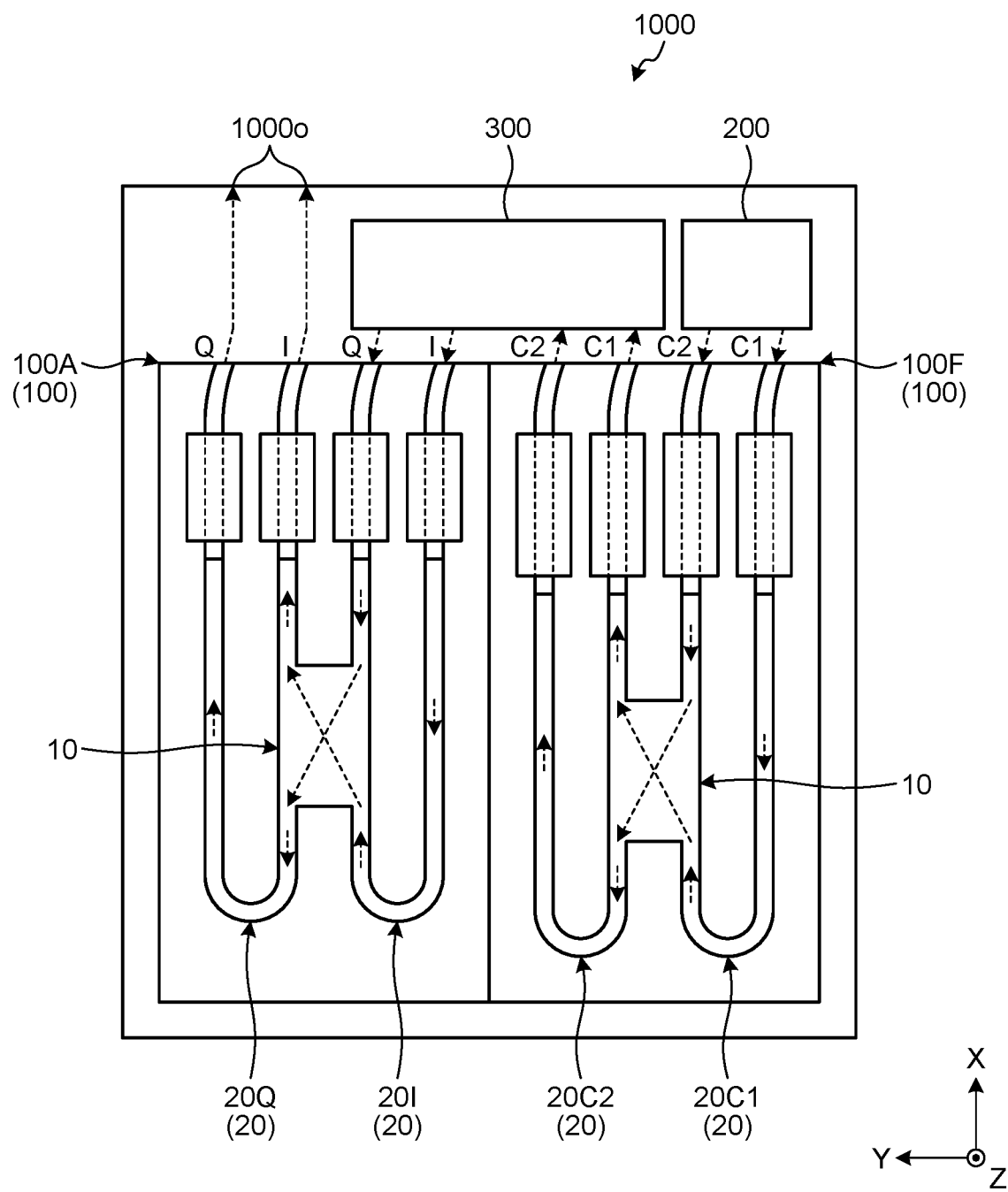
FIG. 7 is an exemplary and schematic plan view of an optical apparatus of a sixth embodiment.

FIG. 7 is a plan view of an optical apparatus 1000 of a sixth embodiment. The optical apparatus 1000 of the present embodiment includes a light source 200, a modulator 300, an optical device 100F (100), and the optical device 100A (100).

The light source 200 outputs continuous waves C1 and C2. For example, the light source 200 is a wavelength-tunable laser. The continuous waves C1 and C2 output from the light source 200 are input to the modulator 300 via respective transmission paths 20C1 and 20C2 (20) of the optical device 100F. The optical device 100F has the same configuration as that of the optical device 100A. The substantial optical path length of the transmission paths 20C1 and 20C2 is about 4200 [μm].

For example, the modulator 300 is a dual polarization In-phase Quadrature (DP-IQ) modulator. Moreover, the modulator 300 is an InP modulator. The modulator 300 modulates the continuous waves C1 and C2, and outputs IQ signals. Each of the IQ signals output from the modulator 300 is output from an output port 1000o of the optical apparatus 1000 via the transmission paths 20I and 20Q (20) of the optical device 100A. The substantial optical path length of the transmission paths 20I and 20Q is about 3200 [μm].

With the present embodiment also, it is possible to obtain the same effects as those of the first embodiment described above. That is, it is possible to arrange the transmission paths of the I signal, the Q signal, and the continuous waves C1 and C2 between the optical devices 100A and 100F and the modulator 300; the transmission paths of the continuous waves C1 and C2 between the light source 200 and the optical device 100F; and the transmission paths between the optical device 100A and the output port 1000o, without intersecting each other three-dimensionally. Moreover, in the optical device 100A, it is possible to set the optical path length of the transmission path 20I for the I signal and the optical path length of the transmission path 20Q for the Q signal to substantially equal. Also, in the optical device 100F, it is possible to set the optical path length of the transmission path 20C1 for the continuous wave C1 and the optical path length of the transmission path 20C2 for the continuous wave C2 substantially equal.

While the embodiments of the disclosure have been described above, the embodiments described above are merely examples and are not intended to limit the scope of the disclosure. The embodiments described above can be implemented in various other forms, and various omissions, substitutions, combinations, and changes may be made without departing from the gist of the disclosure. Moreover, specifications of each configuration, shape, and the like (structure, type, direction, model, size, length, width, thickness, height, number, arrangement, position, material, and the like) may be implemented with appropriate modifications.

According to the disclosure, it is possible to obtain novel and further improved optical device and optical apparatus.

Although the disclosure has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. An optical device, comprising:
   a first end portion in a first direction, the first end portion including:
   a first input port to which light is input,
   a second input port that is separated from the first input port in a second direction intersecting the first direction and to which light is input,
   a first output port that is separated from the second input port in the second direction and from which light is output, and
   a second output port that is separated from the first output port in the second direction and from which light is output;
   a coupler that includes:
   a first port configured to input light in the first direction,
   a second port separated from the first port in the first direction and configured to input light in an opposite direction to the first direction,
   a third port separated from the second port in the second direction and configured to output light in the first direction,
   a fourth port separated from the first port in the second direction and configured to output light in the opposite direction to the first direction, and
   a multimode interference waveguide configured to guide light from the first port to the third port and guide light from the second port to the fourth port;
   a first waveguide that is adjacent to the first port and is optically connected to the first port, the first waveguide having a curved part that is convex in the opposite direction to the first direction, the first waveguide being configured to guide light that is input from the first input port and is input to the coupler via the first port;
   a second waveguide that is adjacent to the second port and is optically connected to the second port, the second waveguide being configured to guide light that is input from the second input port and is input to the coupler via the second port;
   a third waveguide that is adjacent to the third port and is optically connected to the third port, the third waveguide being configured to guide light that is output from the coupler via the third port and is output from the first output port; and
   a fourth waveguide that is adjacent to the fourth port and is optically connected to the fourth port, the fourth waveguide having a curved part that is convex in the opposite direction to the first direction, the fourth waveguide being configured to guide light output from the coupler via the fourth port and output from the second output port, wherein
   a first optical path length of light guided through the first waveguide, the multimode interference waveguide, and the third waveguide, and a second optical path length of light guided through the second waveguide, the multimode interference waveguide, and the fourth waveguide are substantially equal to each other,
   at least one of the first waveguide, the second waveguide, the third waveguide, and the fourth waveguide includes an amplification portion configured to amplify light, the amplification portion including an electrode and an active layer,
   the coupler including the multimode interference waveguide is provided away from the amplification portion including the electrode and the active layer, and
   the optical device is configured to provide amplified unmodulated light to an optical modulator via the first and second output ports.

2. The optical device according to claim 1 wherein, when L is a length of the multimode interference waveguide in the first direction, W is a width of the multimode interference waveguide in the second direction, n is an effective refractive index of the multimode interference waveguide, $\lambda$ is a wavelength of light propagating through the multimode interference waveguide, and m is a natural number of 1 or larger, following equation (1) of $$L \leq 4 \times n \times W^2 \times (2m-1)/\lambda \qquad (1)$$

is satisfied.

3. The optical device according to claim 1, wherein the multimode interference waveguide is configured to guide light of 80 [%] or more from the first waveguide to the third waveguide and guide light of 80 [%] or more from the second waveguide to the fourth waveguide.

4. The optical device according to claim 1, further comprising a temperature control mechanism configured to control temperature of the multimode interference waveguide.

5. The optical device according to claim 4, wherein the temperature control mechanism is an electric heater.

6. The optical device according to claim 1, wherein a first signal waveguide that includes the first waveguide, the multimode interference waveguide, and the third waveguide, and a second signal waveguide that includes the second waveguide, the multimode interference waveguide, and the fourth waveguide, guide components of a modulation signal, phases of the components differing from each other.

7. An optical apparatus, comprising:
   the optical device according to claim 1; and
   an optical component optically connected to the optical device.

* * * * *